Oct. 27, 1953  M. B. RODGERS  2,656,882
ADJUSTABLE LEVER ACTUATED TIRE BEAD BREAKING TOOL
Filed Feb. 16, 1951
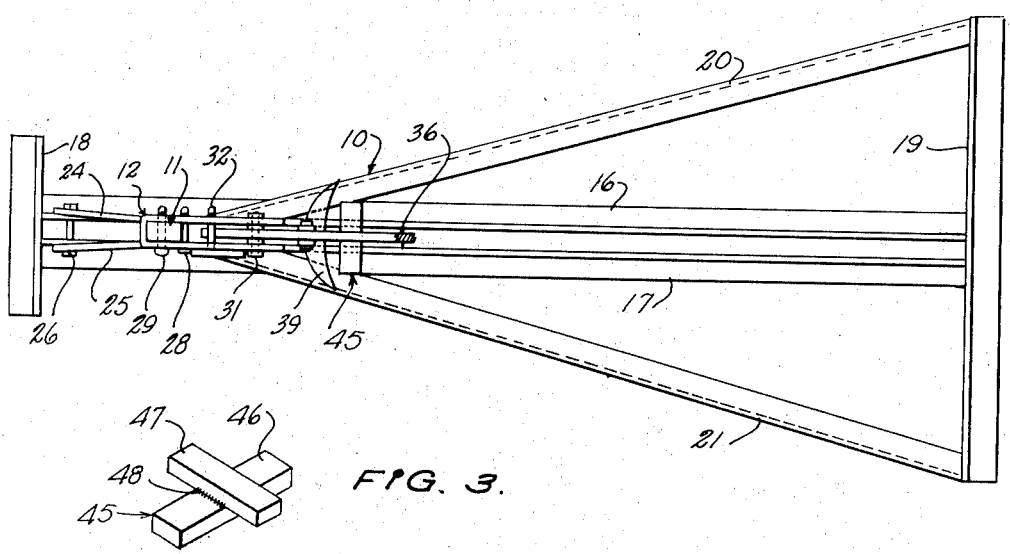
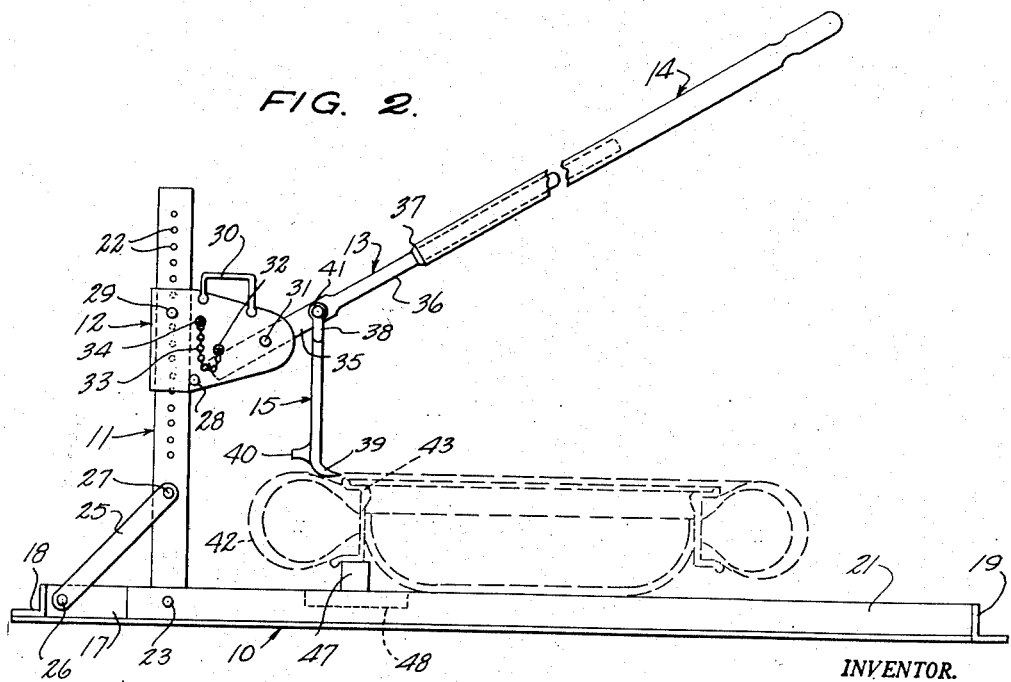
INVENTOR.
MANSEL B. RODGERS,
BY
McMorrow, Berman & Davidson
ATTORNEYS.

Patented Oct. 27, 1953

2,656,882

UNITED STATES PATENT OFFICE 2,656,882

ADJUSTABLE LEVER ACTUATED TIRE BEAD BREAKING TOOL

Mansel B. Rodgers, Memphis, Tenn.

Application February 16, 1951, Serial No. 211,246

1 Claim. (Cl. 157—1.26)

This invention relates to tire breaker tools and more particularly to an adjustable tool for breaking tire casings of various sizes away from the associated tire rims.

It is among the objects of the invention to provide an improved tire breaker tool for breaking tire casings away from the associated rims in dismounting the casings for repair of the casings and inner tubes, which tool is fully adjustable for all commercial sizes of tire casings and rims including the large tires used on farm tractors and heavy industrial and earth moving equipment; which has a mechanical leverage effective to greatly increase the manual force applied to the tool for freeing a casing from its rim; which has a base of sufficient length to prevent tilting or rocking of the tool while in use; which has levelling means for properly supporting casings mounted on dished or bulged wheels; and which is simple, strong and durable in construction, economical to manufacture, and easy to use.

Other objects and advantages will become apparent from a consideration of the following description and the appended claim in conjunction with the accompanying drawing wherein:

Figure 1 is a top plan view of a tire breaking tool illustrative of the invention;

Figure 2 is a side elevational view of the tool illustrated in Figure 1; and

Figure 3 is a perspective view of a levelling block used with the tool when operating on tire casings mounted on bulged or dished wheels.

With continued reference to the drawing, the tool comprises, in general, a base frame 10, a standard 11 secured at one end to the base frame near one end of the latter and extending upwardly from the base frame substantially perpendicular thereto, a bracket 12 slidably mounted on the standard for movements of adjustment toward and away from the base frame, a handle 13 pivotally connected at one end to the bracket 12 and extending from the bracket longitudinally of the base frame toward the end of the latter remote from the standard, a handle extension 14 having in one end a socket receiving the distal end portion of the handle 13 and a pressure arm 15 pivotally connected at one end to the handle 13 adjacent the pivotal connection between the handle and the bracket and depending from the handle toward the base frame 10.

The base frame 10 comprises a pair of angle iron members 16 and 17 disposed in spaced apart and substantially parallel relationship to each other and coterminous at their opposite ends, a cross frame member 18, also formed of angle iron, extending transversely of the members 16 and 17 and secured to these members at the ends of the latter adjacent the standard 11, a second cross frame member 19 longer than the member 18 secured to the members 16 and 17 at the ends of these members remote from the cross member 18 and extending perpendicularly to the members 16 and 17 and symmetrically to the opposite sides thereof, and two brace members 20 and 21, also formed of angle iron, extending respectively from the opposite ends of the cross member 19 to the members 16 and 17 at locations adjacent the standard 11. The members 16, 17, 18 and 19 are disposed with their flat sides down when the frame is operatively positioned on a horizontal supporting surface and the brace members 20 and 21 are positioned with their flat sides up.

The standard 11 is a length of tubular metal stock of rectangular cross sectional shape and is provided intermediate its length with a series of apertures 22 spaced apart longitudinally of the standard and extending substantially from the end of the standard remote from the base frame to a location intermediate the length of the standard. The lower end of the standard is disposed between the upwardly extending flanges of the members 16 and 17 and the standard is secured at its lower end to the base frame by a bolt or pin 23 extending through registering apertures in the flanges of the members 16 and 17 and in the standard 11 near the lower end of the latter.

Diagonal braces 24 and 25 extend from the end of the base frame at the cross member 18 to the standard 11 at a location spaced above the base frame to rigidly support the standard in upright position on the base frame. These braces are secured at their lower ends to the base frame by a bolt or pin 26 extending through registering apertures in the upstanding flanges of the base frame members 16 and 17 and in the braces 24 and 25 near the lower ends of the latter and are secured to the standard by a pin or bolt 27 extending through registering apertures in the braces near the upper ends thereof and in the standard at a location spaced above the pin or bolt 23.

The bracket 12 may conveniently comprise an elongated piece of plate metal having tapered end portions and arcuately rounded extremities bent to U shaped cross sectional form to provide a bight portion and two substantially parallel legs spaced apart to closely receive the standard 11 therebetween.

The bight portion of the bracket 12 is disposed at the side of the standard 11 near the cross member 18 of the base frame and the legs of the bracket extend from the standard toward the end of the base frame most remote from the standard.

A bolt 28 extends through registering apertures in the bracket legs at the side of the standard nearest the cross member 19 of the base frame and near the lower edge of the bracket adjacent the base frame 10 to connect the bracket on the standard for sliding movements toward and away from the base frame. A pin 29 extends through registering apertures in the bracket legs and through a selected one of the apertures 22 in the standard to support the bracket at selected positions of adjustment longitudinally of the standard and a handle 30 is secured to the bracket at the upper edge thereof and projects upwardly from the bracket for raising and lowering the bracket along the standard.

A pivot pin or bolt 31 extends through registering apertures in the bracket legs near the outer ends of the legs and through an aperture in the handle 13 to pivotally connect the handle near one end to the bracket, the handle extending from the pin 31 toward the standard 11 and a locking pin 32 extends through registering apertures in the bracket legs between the pin 31 and the pin or bolt 28 and is engageable with the projecting end of the handle to support the handle in upraised position, as illustrated in Figure 2, to facilitate placing a tire and rim assembly on the base frame 10. The pin 32 is connected to the bracket by a short length of chain 33 one end of which is attached to the pin 32 and the other end of which is attached to one of the bracket legs by a suitable connector 34.

The handle 13 has an end portion 35 of a thickness substantially equal to the thickness of the standard 11 so that it fits closely between the legs of the bracket 12 and outwardly of this end portion 35 has a reduced portion 36, preferably of circular cross sectional shape, providing a grip for applying manual pressure to the handle.

The handle extension 14 is an elongated tubular bar having an internal diameter closely receiving the outer portion 36 of the handle and an annular shoulder or collar 37 is provided on the handle intermediate the length of the grip portion 36 to provide a stop for the corresponding end of the extension 14 and position the extension on the handle.

The pressure arm 15 is a straight bar having at one end a fork 38 which straddles the end portion 35 of the handle adjacent the distal ends of the bracket legs and is provided with terminal eyes disposed one at each side of the handle and provided at its opposite end with a pressure foot formation 39 extending to one side of the bar and a lug or anvil 40 extending toward the opposite side of the bar and toward the standard 11. A pivot pin 41 extends through the eyes of the fork formation 38 and through an aperture in the end portion 35 of the handle to pivotally connect the pressure bar 15 to the handle so that the pressure bar depends from the handle adjacent the corresponding end of the bracket 12.

The pressure foot 39 comprises a pair of spaced apart and outwardly tapered lugs projecting from the lower end of the pressure arm in a direction away from the standard 11 for insertion between the bead portion of a tire casing 42 and the corresponding flange of an associated tire rim 43 and the anvil 40 provides an abutment to be struck by a hammer to force the tire breaking lugs between the casing bead and the rim flange.

In using the tool, a tire and rim assembly is placed on the base platform 10 so that the upper flange of the rim is adjacent the pressure foot 39 on the lower end of the pressure arm 15. Manual pressure is then applied to the distal end of the handle or lever 36 forcing the pressure foot downwardly to push the bead portion of the tire casing away from the adjacent rim flange. If the casing is badly stuck to the rim, so that the downwardly moving pressure foot merely deforms the casing without breaking it loose from the rim flange, the handle is pushed down until the sharp ends of the pressure foot are substantially even with the inner surface of the flange whereupon the anvil 40 is struck with a hammer to drive the foot between the flange and the bead portion of the casing, whereupon pressure applied to the distal end of the handle 13 will positively force the bead portion of the casing away from the rim flange. Once the casing has been initially broken from the flange, it may be completely freed by manual pressure on the handle alone, the tire and rim assembly being rotated on the base frame as the casing is progressively broken away around the rim.

Certain types of vehicle wheels, such as the double rear wheels on trucks, are dished or bulged laterally within the tire rim so that, when the bulged side of the wheel is placed on the base frame 10 of the breaker tool, the adjacent flange of the rim is spaced from the upper surface of the base frame. In order to accommodate the tool to such a wheel shape, a levelling block, generally indicated at 45 and particularly illustrated in Figure 3, is provided.

This levelling block comprises two rectangular blocks 46 and 47 so disposed that one block extends perpendicularly across one face of the other block substantially at the mid-length location of such other block, the two blocks being symmetrically arranged relative to each other to provide a substantially cruciform structure. The two blocks 46 and 47 may be formed of any suitable material and, if formed of a material such as wood, may be secured together by a bolt or rivet. If formed of iron, they may be welded together, as indicated at 48 in Figure 3.

The block 46 has a width such that it is closely received between the upstanding flanges of the base frame members 16 and 17. The block 47 then extends across the upper edges of the flanges of these base frame members and has a thickness substantially equal to the bulge or dish of the dished wheel.

The levelling block structure 45 is slidable longitudinally of the base frame members 16 and 17 and is so positioned that when the upper flange of the tire rim 43 is disposed adjacent the foot formation 39 of the pressure arm 15 the block 47 is disposed under the lower flange of the rim and almost directly below the pressure foot to support the rim against the pressure applied to the upper side of the tire casing. When the tool is used to loosen the tire casings on the usual flat wheels the levelling block 45 is removed from the base frame and the lower rim flange permitted to rest directly upon the upper edges of the upstanding flanges of the members 16 and 17 and on the flat upper surfaces of the braces 20 and 21.

By adjustably moving the bracket 12 along the standard 11 toward and away from the base frame 10 the tool can be adjusted to any commercial size of pneumatic tire. The length of the pressure arm 15 maintains the bracket well above the tire casing at all times, so that there is no interference between the bracket and any size of tire and the close proximity of the pivot pins 31 and 41 and the length of the handle 13 provides a mechanical leverage which increases the manual pressure applied to the distal end of the handle to such an extent that nearly all tire casings can be broken free of their associated rims by moderate manual pressure on the handle. The length of the base frame, being substantially as long as the combined length of the handle 13 and extension 14, prevents the tool from rocking or tilting up when a downward force is applied to the distal end of the handle or the extension. These various features render the tool easily usable by one man to free tire casings of substantially all commercial sizes. The locking pin 32 will maintain the handle out of the way while a tire is being placed in proper position on the base frame but, if the handle is found to interfere with placing a large tire, such as a farm tractor tire, on the frame, the pivot pin 31 may be withdrawn and the handle removed from the bracket until the tire has been properly disposed on the base frame of the tool.

With further reference to the adjustable features of the device, it is believed to be particularly important to note that the several parts of the device are all inter-related, so far as their adjustability relative to one another is concerned, as to make a single size of the device applicable universally to the engagement of tire casings of wheels varying widely in respect to their diameter and transverse breadth. These desirable characteristics of the invention obtain by reason of the provision of the pair of spaced, parallel members 16, 17, the standard being normal to said members and being disposed in a plane common to that passing through the space between the members. The operating handle 13, in this regard, is spaced above the members, and swings in a plane common to that passing through the space between the members, said handle being pivotally connected to the standard by a means adjustable longitudinally of the standard toward and away from the bars. Further, the handle is provided with a depending arm swinging in a plane common to that in which the handle itself swings, the free end of the depending arm being swingably adjustable toward and away from the standard in each position to which the arm is adjusted, with its associated handle, longitudinally of the standard. Finally, completing the construction, I utilize a leveling block adjustable toward and away from the standard upon the members or bars 16 and 17. All these parts, as will be seen, are interrelated for cooperation during the actual operation of breaking a casing away from its associated wheel rim, with all the parts being adjustable relative to one another within a common plane shown as a vertical plane in the several figures of the drawing.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A manually operated tool for breaking tire casings away from their associated rims, comprising: a base frame including a pair of elongated, straight members rigidly joined in closely spaced, parallel relation; a standard extending upwardly from and arranged normally to said members; a U-shaped bracket including a bight and legs projecting in spaced relation from said bight having the bight and portions of the legs adjacent the bight slidably embracing and connected to said standard for movement toward and away from said base frame with portions of the legs adjacent the free ends being exteriorly of said standard; an operating handle arranged longitudinally of and spaced above said members and having the portion adjacent one end pivotally connected to the exterior portions of the legs for swinging movement toward and away from said members; means carried by the legs and selectively engageable with means formed on said standard for supporting said bracket at selected positions of adjustment longitudinally of the standard; a locking pin removably supported in the exterior portions of the legs and engageable with the upper edge of said handle adjacent said one end of the latter for supporting said handle in an upraised position; a pressure arm depending from and pivotally connected at one end to said handle adjacent to and spaced from the exterior portions of the legs; the other end of said pressure arm being engageable against a tire casing supported on the base frame to break said casing away from its associated rim, said pressure arm swinging in a plane common to that of the operating handle for swingable adjustment of the pressure arm toward and away from the standard, in each position to which said bracket is adjusted longitudinally of the standard; and a leveling block slidably mounted on said members for adjustment toward and away from the standard and adapted to engage under and support, in spaced relation to the members, the flange of a rim supported upon said members.

MANSEL B. RODGERS.

References Cited in the file of this patent

UNITED STATES PATENTS

| Number | Name | Date |
|---|---|---|
| 2,338,696 | West et al. | Jan. 11, 1944 |
| 2,433,113 | Graves et al. | Dec. 23, 1947 |
| 2,449,960 | Toles | Sept. 21, 1948 |
| 2,474,926 | York | July 5, 1949 |
| 2,488,539 | Holbrook | Nov. 22, 1949 |
| 2,523,979 | Weeks et al. | Sept. 26, 1950 |

FOREIGN PATENTS

| Number | Country | Date |
|---|---|---|
| 720,878 | France | Dec. 12, 1931 |